Figure 1:
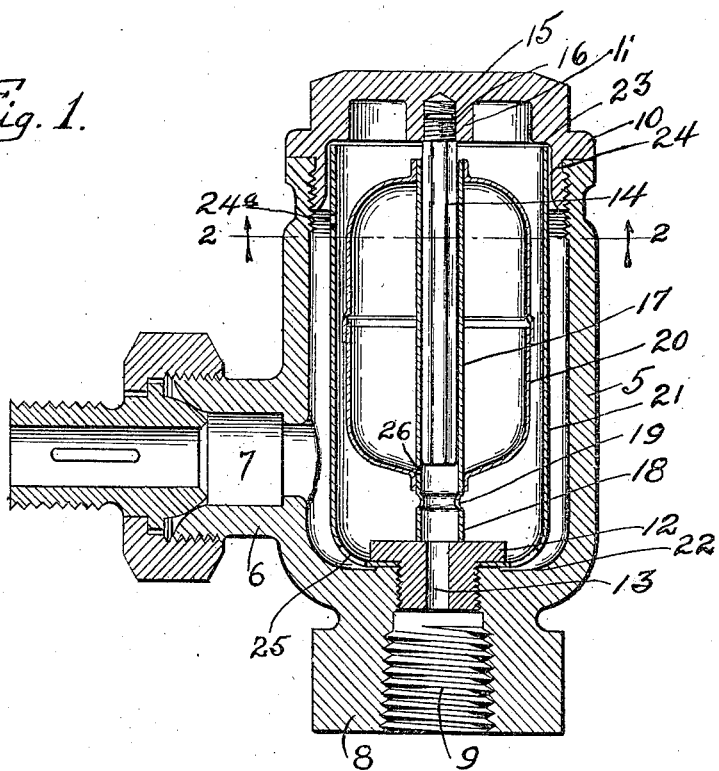

F. W. LEUTHESSER.
STEAM, AIR, AND WATER TRAP VALVE.
APPLICATION FILED FEB. 4, 1910.

960,972. Patented June 7, 1910.

Witnesses:
Ephraim Banning
Wm P Bond

Inventor:
Fred W. Leuthesser
By Banning & Banning Attys.

UNITED STATES PATENT OFFICE.

FRED W. LEUTHESSER, OF CHICAGO, ILLINOIS.

STEAM, AIR, AND WATER TRAP VALVE.

960,972.  Specification of Letters Patent.  Patented June 7, 1910.

Application filed February 4, 1910. Serial No. 542,016.

*To all whom it may concern:*

Be it known that I, FRED W. LEUTHESSER, a citizen of the United States, residing at Chicago, in the county of Cook and State of Illinois, have invented certain new and useful Improvements in Steam, Air, and Water Trap Valves, of which the following is a specification.

The valve of the present invention relates to a type employed with steam heating systems, either vacuum, gravity or drain, and in use is connected to the discharge end of a radiator and to the return pipe of the system, and serves to prevent an undue waste of steam when air and water of condensation are passing out of the radiator.

The valve of the present invention employs a float member, the actuation of which governs the opening and closing of the water discharge passage in the valve casing. The float is guided in its movements within the casing by a guide member, and the float dispenses with tapered plugs or other means for insertion into the water discharge passage to close the same.

One object of the present invention is to form a shell entered into the interior of the casing and surrounding the float so as to protect it from the inrushing volume of water entering through the water inlet of the casing. This shell is interposed between the float and the water inlet of the casing, so that the water rushing in through such inlet will first strike against the shell and then enter the interior of the shell, preferably through a plurality of openings, so as to avoid forcible contact with the float. By the time the water has reached the float, its force will be reduced and agitation avoided, and the water surrounding the float will be non-agitated, and thus the float will always be sustained in a still body of water. This will prevent, to a very great degree, any rattling of the float during the entrance of water into the valve casing.

Another object of the invention is to so construct the interior mechanism that it may be easily removed from the casing and disassembled, so as to allow cleaning or repairing of the parts.

A further object of the invention is to form a plurality of air passages between the guide member and a tube extending through the float, which passages extend vertically and are continuous and unimpeded, so that the air passing therethrough will not be deflected from a direct course downward.

A further object is to provide an opening in the float tube to permit any air or water, which may accidentally or otherwise seep through and gather in the interior of the float, to be discharged therefrom.

Still another object is to so form the float that it must always be inserted into the casing in a manner to have the same end always extend downwardly, thus making the float non-reversible.

Figure 2:
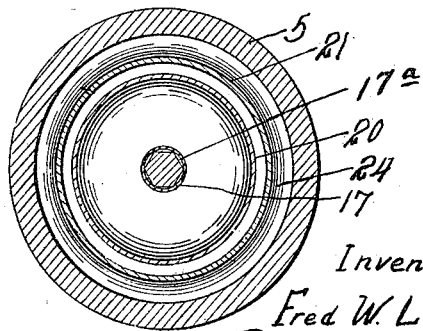

In the drawings, Figure 1 is a sectional elevation of the valve of the present invention; and Fig. 2 is a cross section on line 2—2 of Fig. 1.

As shown in Fig. 1, the valve casing 5, which is generally cylindrical in form, is provided with an exteriorly screw threaded nipple 6 having an inlet opening 7 therein, which nipple is connected by a suitable coupling with the discharge end of the radiator. The casing is also provided with a downwardly depending stem 8, which is formed in its interior with a water discharge passage 9. The casing has secured to its upper end a cap or cover 10, formed with a depending boss 11, which cap is connected to the casing by means of screw threads; and screw-threaded into the water discharge passage 9 is a shouldered valve plug 12, having formed therein a water and air inlet port 13 communicating with the interior of the casing and with the discharge passage.

Depending from the cap 10 is a guide stem 14, having formed on its upper end a screw-threaded portion 16 which is entered into a screw-threaded recess 15 in the boss 11 of the cap or cover. The stem, as shown, is in the form of a polygon in cross section, and depends downwardly into a vertically extending tube 17, the lower end 18 of which rests upon the top of the shouldered valve plug 12 and surrounds the water and air inlet port 13 therein.

As shown in the drawings, by forming the guide member so that there is a difference between the configuration of the outer surface of the guide member and the inner surface of the tube, there would be produced, when the guide member is inserted in the tube, a plurality of unobstructed vertically extending passageways 17$^a$, which are utilized to conduct the air from the interior of the casing. These passageways will be separate and distinct from each other and will be of a continuously vertically extending formation from end to end thereof, so that the air, in passing down through these passageways, will not be deflected from a direct course downward.

The stem is formed, at a point adjacent to its lower end, with an inwardly extending bead 19, the function of which is to prevent the float from being placed in the casing reversed. It must be inserted in the way shown in the drawings, otherwise it would lie too close to the hollow of the casing, thus making the line of flotation lower than intended; and also the opening 26 in the tube would be at the upper end of the float, where it would perform no useful function in drawing water out of the float. The tube is carried by and affixed to a float member 20, of the type known as closed, and which, in the form shown, is composed of two sections joined together and has its upper and lower ends rounded.

Surrounding the float is a shell 21, which has its lower end inturned as at 22, and the inturned edges are clamped between the floor or bottom wall of the casing and the plug 12. The upper end 23 of the shell is open, and, as shown, extends beyond the extremities of the float, thus completely surrounding the float from top to bottom. The shell is so positioned with respect to the casing that a passageway 24 is provided between the side wall of the shell and the cap or plug, which passageway permits air to enter from the chamber of the casing into the interior of the shell, to be thence conducted through the air passages 17$^a$ formed between the guide stem 14 and the interior wall of the tube 17 to the discharge passage 9. The shell is further provided with an air induct 24$^a$ which would act in case the passageway 24 should become clogged. The shell, as shown, is provided, at a point adjacent to its lower end, with a plurality of water inlet openings 25, through which the water of condensation passes into the interior thereof, so as to come gently into contact with the float. The tube 17 is provided, at a point adjacent to the lower edge of the interior of the float member, with an opening 26, through which any water or air, which may accidentally or otherwise seep through the walls of the float and enter into the interior thereof, will pass out and into the water discharge opening 13, so that there will be no danger of any congestion of water or air in the interior of the float to interfere with or prevent its flotation when the water has risen in the casing to the line of flotation.

The operation is as follows: When steam is admitted into the radiator, air will be forced out therefrom and will pass through the inlet passage 7 into the interior of the casing. It will then rise to the top of the casing and enter and flow through the air discharge passages formed between the stem 14 and the tube 17, and thence will be discharged through the outlet opening 13. More or less water will usually be present in the bottom of the valve casing, so that any steam which might follow the air will be forced upward in the casing. The steam will contain more or less moisture, however, so that it will not readily flow through the small air outlet passages heretofore described; and these relatively small air passages will act in conjunction with the water in the bottom of the casing, to prevent any undue amount of steam from passing from the radiator into the valve. As water of condensation is formed in the radiator, it will pass through the inlet 7 into the valve casing, and will rise therein until the point is reached which marks the line of flotation of the float member, and when this point is reached the float will rise, carrying with it the tube 17, and this will unseat the lower end of the tube around the discharge outlet 13, permitting the water to pass from the interior of the casing through said outlet; and the upper end of the tube 17 will rest against the lower face of the boss 11 formed in the cap 19, thus cutting off the air passages. After the initial accumulation of water of condensation in the valve casing, a constant seal will be maintained in said casing to prevent undue ingress of steam from the radiator thereinto, and the float will, at all times, be guarded against the direct impingement of the inflowing water, so that it will constantly rest in a quiet body of water, with the result that its operation will be practically noiseless; and a further advantage is that the float is protected from any motor action of the inrushing water, which would tend to produce irregularities in its movements, which would be undesirable.

As will be seen from a study of the drawing, by removing the cap 10, the entire inner mechanism of the valve can be readily removed, so as to allow every portion of it to be cleaned or repaired.

I claim:

1. In a valve of the class described, the combination of a casing provided with an inlet passage and a discharge passage, a closed float within the casing for governing the discharge passage, a shell surrounding the float open at its upper end for the eduction of air and provided with an inlet for water below the line of flotation of the float, said shell extending beyond the ends of the float and anchored at its lower end, a tube extending through said float and secured to the float, the lower end of said tube surrounding the discharge passage and cutting off communication between the float chamber and the discharge passage when the float is in normal position, a fixed guide member entered into said tube and extending downward to a point beyond midway the length of the float, and said tube having therein a plurality of unimpeded vertically extending air passages formed between the exterior surface of the guide member and the interior surface of the tube, permitting air to pass from the interior of the casing into the discharge passage with a direct flow downward, substantially as described.

2. In a valve of the class described, the combination of a casing provided with an inlet passage and a discharge passage, a closed float within the casing for governing the discharge passage, a shell surrounding the float open at its upper end for the eduction of air and provided with an inlet for water below the line of flotation, said shell extending beyond the ends of the float and anchored at its lower end, a circular tube extending through said float and secured to the float, the lower end of said tube surrounding the discharge passage and cutting off communication between the float chamber and the discharge passage when the float is in normal position, a cover secured to the upper end of the casing, a guide member affixed to said cover, said guide member extending downward to a point beyond midway the length of the float, said guide member being in the form of a polygon in cross-section, and said tube having therein a plurality of unimpeded vertically extending air passages formed between the exterior face of the guide member and the interior face of the tube for permitting air to pass from the interior of the casing into the discharge passage with a direct flow downward, substantially as described.

3. In a valve of the class described, the combination of a casing provided with an inlet passage and a discharge passage, a closed float within the casing for governing the discharge passage, a shell surrounding the float open at its upper end for the eduction of air and provided with an inlet for water below the line of flotation of the float, said shell extending beyond the ends of the float and anchored at its lower end, a tube extending through said float and secured to the float, the lower end of said tube surrounding the discharge passage when the float is in normal position, a fixed guide member entered into said tube, said tube having a plurality of unimpeded vertically extending air passages therein formed between the exterior surface of the guide member and the interior surface of the tube, permitting air to pass from the interior of the casing into the discharge passage with a direct flow downward, and an inwardly extending abutment formed adjacent to the lower end of the tube for insuring the correct insertion of the float into the casing, substantially as described.

4. In a valve of the class described, the combination of a casing having a chamber provided with an inlet passage and a discharge passage, a closed float within said casing for governing the discharge passage, a shell surrounding and inclosing said float and extending underneath the lower end of the float and provided with a water inlet passage in its bottom and an unrestricted air eduction passage at its upper end and having an imperforate body between the air and water passages, a tube extending through and fixed to said float and having its lower end surrounding the discharge passage and cutting off communication between the float chamber and the discharge passage when the float is in normal position, a fixed guide member entering said tube and extending approximately the full length of the float, said tube having therein a passageway for air located between the exterior surface of the guide member and the interior surface of the tube for permitting air to pass from the interior of the casing into the discharge passage, substantially as described.

5. In a valve of the class described, the combination of a casing having a chamber provided with an inlet passage and a discharge passage, a closed float within said casing for governing the discharge passage, a shell surrounding and inclosing said float and extending underneath the lower end of the float and provided with a water inlet passage in its bottom and an air eduction passage at its upper end, a tube extending through and fixed to said float and having its lower end surrounding the discharge passage and cutting off communication between the float chamber and the discharge passage when the float is in normal position, a cover secured to the upper end of the casing, a guide member affixed to said cover, said guide member being in the form of a polygon in cross-section and extending approximately the full length of the float, said tube having therein a plurality of unimpeded vertically extending air passages between the exterior face of the guide member and the interior face of the tube for permitting air to pass from the interior of the casing into the discharge passage with a direct flow downward, substantially as described.

6. In a valve of the class described, the combination of a casing having a chamber provided with an inlet passage and a discharge passage, a closed float within said casing for governing the discharge passage, a shell surrounding and inclosing said float and provided with a water inlet passage in its bottom and an unrestricted air eduction passage at its upper end and having an imperforate body between the air and water passages, a tube extending through and fixed to said float and having its lower end surrounding the discharge passage when the float is in normal position, a fixed guide member entering said tube, said tube having therein a passageway for air located between the exterior surface of the guide member and the interior surface of the tube for permitting air to pass from the interior of the casing into the discharge passage, and an inwardly extending abutment formed adjacent to the lower end of the tube for insuring the correct insertion of the float into the casing, substantially as described.

7. In a valve of the class described, the combination of a casing provided with an inlet passage and a discharge passage, a shouldered valve plug in the floor of the casing and provided with a discharge port communicating with the discharge passage, a closed float within the casing for governing the discharge passage, a shell surrounding and inclosing said float open at its upper end for the eduction of air and provided with an inlet for water below the line of flotation of the float, said shell extending beyond the ends of the float and anchored at its lower end, a tube extending through said float and secured to the float, the lower end of said tube surrounding the discharge port in the valve plug when the float is in normal position, the lower end of the shell being clamped between the shouldered valve plug and the floor of the casing, a fixed guide member entered into said tube, and said tube having therein a plurality of unimpeded vertically extending air passages formed between the exterior surface of the guide member and the interior surface of the tube, permitting air to pass from the interior of the casing into the discharge passage with a direct flow downward, substantially as described.

8. In a valve of the class described, the combination of a casing having a chamber provided with an inlet passage and a discharge passage, a shouldered valve plug entered into the floor of the casing and provided with a discharge port communicating with the discharge passage, a closed float within said casing for governing the discharge passage, a shell surrounding and inclosing said float and provided with a water inlet passage in its bottom and an unrestricted air eduction passage at its upper end and having an imperforate body between the air and water passages, a tube extending through and fixed to said float and having its lower end surrounding the discharge port in the valve plug when the float is in normal position, the lower end of the shell being clamped between the shouldered valve plug and the floor of the casing, a fixed guide member entering said tube and said tube having therein a passage for air located between the exterior surface of the guide member and the interior surface of the tube for permitting air to pass from the interior of the casing into the discharge passage, substantially as described.

9. In a valve of the class described, the combination of a casing provided with an inlet passage and a discharge passage, a closed float within the casing for governing the discharge passage, a shell surrounding the float open at its upper end for the eduction of air and provided with an inlet for water below the line of flotation of the float, said shell extending beyond the ends of the float and anchored at its lower end, a tube extending through said float and secured to the float, the lower end of said tube surrounding the discharge passage when the float is in normal position, a fixed guide member entered in said tube, said tube having therein a plurality of unimpeded vertically extending air passages formed between the exterior surface of the guide member and the interior surface of the tube, permitting air to pass from the interior of the casing into the discharge chamber with a direct flow downward, the tube having an opening to permit water and steam to pass from the interior of the float into the tube to be discharged, substantially as described.

10. In a valve of the class described, the combination of a casing having a chamber provided with an inlet passage and a discharge passage, a closed float within said casing for governing the discharge passage, a shell surrounding and inclosing said float and extending underneath the lower end of the float and provided with a water inlet passage in its bottom and an unrestricted air eduction passage at its upper end and having an imperforate body between the air and water passages, a tube extending through and fixed to said float and having its lower end surrounding the discharge passage and cutting off communication between the float chamber and the discharge passage when the float is in normal position, a fixed guide member entering said tube and extending approximately the full length of the float and said tube having therein a passageway for air located between the exterior surface of the guide member and the interior surface of the tube for permitting air to pass from the interior of the casing into the discharge passage, the tube having an opening to permit water and steam to pass from the interior of the float into the tube to be discharged, substantially as described.

11. In a valve of the class described, the combination of a casing provided with an inlet passage and a discharge passage, a closed float within the casing for governing the discharge passage, a shell surrounding the float open at its upper end for the eduction of air and provided with an inlet for water below the line of flotation of the float, said shell extending beyond the ends of the float and anchored at its lower end, a tube extending through said float and secured to the float, the lower end of said tube surrounding the discharge passage when the float is in normal position, a fixed guide member entered into said tube, and said tube having therein a plurality of unimpeded vertically extending air passages formed between the exterior surface of the guide member and the interior surface of the tube, permitting air to pass from the interior of the casing into the discharge passage with a direct flow downward, said shell furnishing a shield against an inrush of water forcibly striking the lower end of the float, substantially as described.

12. In a valve of the class described, the combination of a casing having a chamber provided with an inlet passage and a discharge passage, a closed float within said casing for governing the discharge passage, a shell surrounding and inclosing said float and provided with a water inlet passage in its bottom and an unrestricted air eduction passage at its upper end and having an imperforate body between the air and water passages, a tube extending through and fixed to said float and having its lower end surrounding the discharge passage when the float is in normal position, a fixed guide member entering said tube, and said tube having therein a passageway for air located between the exterior surface of the guide member and the interior surface of the tube for permitting air to pass from the interior of the casing into the discharge passage, said shell furnishing a shield against an inrush of water forcibly striking the lower end of the float, substantially as described.

13. In a valve of the class described, the combination of a casing having a chamber provided with a water inlet passage and a water discharge passage, a float within the casing for governing the discharge passage, a vertical tube centrally extending through the float, a shell surrounding the float, the lower end of the shell wholly inclosing the lower end of the float and having a water inlet opening formed therein and having its upper end in communication with the chamber of the casing, said shell being formed of an imperforate body between the water inlet opening and its upper edge, the shell furnishing a well for the accumulation of a body of still water in which the float operates, a guide stem entered into the central tube of the float, and said tube having an air passage between the guide stem and the float tube for conducting air from the chamber of the casing into the discharge passage, substantially as described.

14. In a valve of the class described, the combination of a casing having a chamber provided with a water inlet passage and a water discharge passage, a float within the casing for governing the discharge passage, a vertical tube centrally extending through the float, a shell surrounding the float, the lower end of the shell wholly inclosing the lower end of the float and having a water inlet opening formed therein, said shell being formed of an imperforate body between the water inlet opening and its upper edge, the shell furnishing a well for the accumulation of a body of still water in which the float operates and having its upper end in communication with the chamber of the casing, a guide stem entered into the central tube of the float and said stem having therein an air passage between the guide stem and float tube for conducting air from the chamber into the discharge passage, substantially as described.

FRED W. LEUTHESSER.

Witnesses:
W<small>M</small>. P. B<small>OND</small>,
F<small>RANCES</small> M. F<small>ROST</small>.